(No Model.)

J. A. HOUSE.
MACHINE FOR CUTTING THE EDGES OF CORSETS, &c.

No. 260,869. Patented July 11, 1882.

Witnesses.

Inventor:
James A. House
by Crosby & Gregory
attys.

UNITED STATES PATENT OFFICE.

JAMES A. HOUSE, OF BRIDGEPORT, CONNECTICUT.

MACHINE FOR CUTTING THE EDGES OF CORSETS, &c.

SPECIFICATION forming part of Letters Patent No. 260,869, dated July 11, 1882.

Application filed May 25, 1882. (No model.)

*To all whom it may concern:*

Be it known that I, JAMES A. HOUSE, of Bridgeport, county of Fairfield, State of Connecticut, have invented an Improvement in Machines for Cutting and Shaping the Edges of Corsets, &c., of which the following description, in connection with the accompanying drawings, is a specification.

In the manufacture of corsets, after the outer and inner plies of material are stitched together and the bone or stiffening pockets are formed, the upper and lower edges of the corset have to be trimmed and shaped prior to binding and finishing the said edges. This trimming and shaping has heretofore been done by shears operated by hand.

The object of my invention is the production of a machine for this work to enable the same to be done quickly and accurately; but it is obvious that the machine produced by me may be used to cut and trim other articles than corsets.

In corset-work the thickness of the material is usually that of two plies of cloth, but there are frequent seams to be cut transversely, and to effect the proper movement of the corset between the cutters I found it necessary to employ a mechanical feed which should adapt itself to the thickness of the material, and in the construction of my machine I have shown the feeding-wheel driven from one of the cutters, and in front of the lower cutter of the apparatus I have placed a disk or wheel to constitute the under or second member of the feed.

Figure 1:
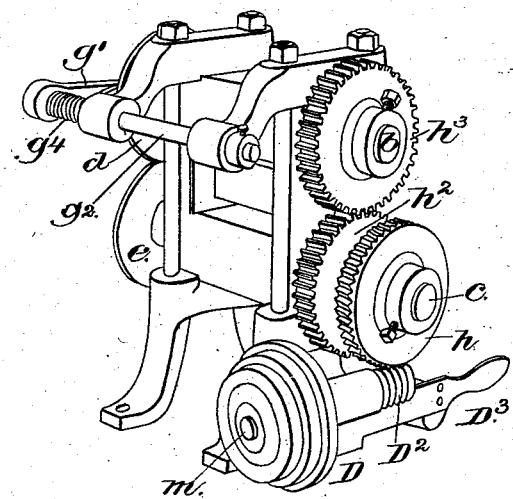
Figure 2:
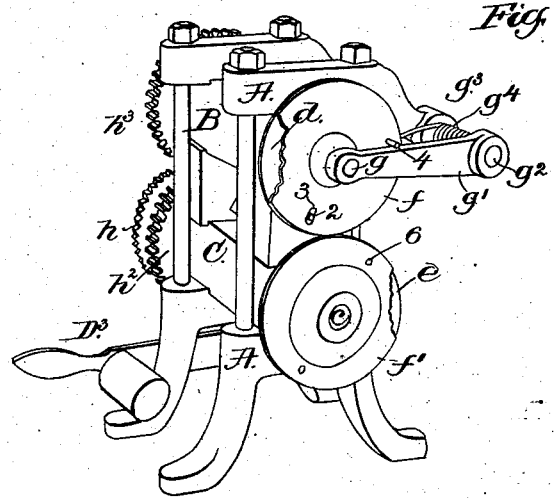

Figure 1 represents one of my machines in perspective, looking at it toward one of its rear corners; and Fig. 2 is a perspective looking at it toward one of its front corners.

The frame-work A receives in it the plumber-boxes B C, in which are placed the two shafts $b$ $c$. Shaft $b$ has connected with its front end the circular shear or cutter $d$, and shaft $c$ has attached to its front end the circular shear or cutter $e$, between which cutters the corset or other article to be cut is passed. Power is applied to the belt-pulley D on a shaft, $m$, in a pivoted bearing, $D^3$, and a worm, $D^2$, on the said shaft engages a worm-gear, $h$, on shaft $c$, and turns the said shaft, causing the gear $h^2$, thrown in mesh with gear $h^3$ on shaft $b$, to rotate shaft $b$ in unison with shaft $c$. The lower feed-wheel, $f'$, is placed on the end of shaft $c$, in front of the cutter $e$, and the cutter and feed-wheel $f'$ are preferably united by pins 6. The edge of the cutter $d$ passes the cutter $e$ close to its rear side. The uppermost feed-wheel, $f$, is supported by the stud or axle $g$ of the movable bearing or arm $g'$, extending from rod $g^2$, held loosely in suitable bearings. (Shown fully in Fig. 1.) The rod $g^2$ is surrounded by a spring, $g^4$, one end of which, as shown at 4, acts upon the arm $g'$, and keeps the edge of the upper feed-wheel, $f$, pressed down upon the material between it and the lower feed-wheel, $f'$. The upper feed-wheel has a slot, 3, (see Fig. 2,) into which enters a pin, 2, projected from the front face of the upper cutter, $d$, so that the upper cutter rotates the upper feed-wheel; but by reason of the slot-and-pin connection and the spring $g^4$ the upper feed-wheel, as it rotates, is free to rise and fall to the inequalities, seams, &c., in the work, and always feed the same positively as it is to be cut by the cutters. To stop the cutters it is only necessary to depress the lever or bearing $D^3$ far enough to disengage the worm $D^2$ from the worm-gear $h$. This may be done, if desired, by a suitable treadle connected with $D^3$. The edges of the feed-wheels will preferably be roughened. The edges of the corset introduced between the feed-wheels $f f'$ will be fed positively forward and presented to the cutters $d$ $e$, which will trim the said edge smoothly and evenly.

I do not broadly claim circular shears, as they are old, and I am also aware that cloth has been automatically fed to circular cutters.

I claim—

1. The circular cutters $d$ $e$ and feed-wheel $f'$, combined with a feed-wheel, $f$, the axle or bearing of which is free to rise and fall to enable the said feed-wheel to adapt itself to the thickness of the material being fed and cut, substantially as described.

2. The upper cutting-disk, $d$, and its pin, combined with the feed-wheel $f$, having the slot 3 and the support for the said feed-wheel, whereby the cutting-disk is made to rotate the feed-wheel, substantially as described.

3. The cutting-disks, feed-wheels, shafts $b$ $c$, and their connected gearing, combined with the worm-shaft $m$, held in the movable bearing $D^3$, substantially as and for the purpose described.

In testimony whereof I have signed my name to this specification in the presence of two subscribing witnesses.

JAMES ALFORD HOUSE.

Witnesses:
CHARLES H. DIMOND,
HENRY F. GOODWIN.